(12) United States Patent
Lu et al.

(10) Patent No.: US 8,773,481 B2
(45) Date of Patent: Jul. 8, 2014

(54) PIXEL STRUCTURE, TOUCH DISPLAY PANEL AND LIQUID CRYSTAL DISPLAY

(75) Inventors: Ying-Chi Lu, Taoyuan County (TW); Chih-Yun Chai, Taoyuan County (TW); Ming-Chun Li, Taichung (TW); Hong-Ji Huang, Hsinchu (TW); Seok-Lyul Lee, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 1123 days.

(21) Appl. No.: 12/720,674

(22) Filed: Mar. 10, 2010

(65) Prior Publication Data

US 2010/0231544 A1    Sep. 16, 2010

(30) Foreign Application Priority Data

Mar. 11, 2009 (TW) ............................... 98107894 A

(51) Int. Cl.
G09G 5/02 (2006.01)

(52) U.S. Cl.
USPC ........... 345/695; 345/173; 345/694; 345/104; 349/139; 349/99

(58) Field of Classification Search
USPC ........... 345/87–104, 156, 173–174, 694–695; 349/139–141, 147, 99
See application file for complete search history.

(56) References Cited

U.S. PATENT DOCUMENTS

| | | | | |
|---|---|---|---|---|
| 6,809,789 B2 * | 10/2004 | Kim et al. | ...................... | 349/139 |
| 7,839,472 B2 * | 11/2010 | Wada | ............................ | 349/114 |
| 2004/0046915 A1 | 3/2004 | Takeda et al. | | |
| 2005/0078260 A1 * | 4/2005 | Ono et al. | ...................... | 349/141 |
| 2005/0078261 A1 * | 4/2005 | Ono et al. | ...................... | 349/141 |
| 2005/0105032 A1 * | 5/2005 | Ono et al. | ...................... | 349/139 |
| 2005/0105033 A1 * | 5/2005 | Itou et al. | ...................... | 349/141 |
| 2005/0264720 A1 * | 12/2005 | Itou et al. | ........................ | 349/99 |

(Continued)

FOREIGN PATENT DOCUMENTS

| | | |
|---|---|---|
| CN | 1441295 | 9/2003 |
| KR | 1020020076403 | 10/2002 |
| TW | 200907773 | 2/2009 |

OTHER PUBLICATIONS

"First Office Action of China Counterpart Application", issued on Nov. 29, 2010, p. 1-p. 6, in which the listed references were cited.

(Continued)

*Primary Examiner* — Lun-Yi Lao
*Assistant Examiner* — Priyank Shah
(74) *Attorney, Agent, or Firm* — Jianq Chyun IP Office

(57) ABSTRACT

A pixel structure disposed on a substrate including a scan line, a data line, an active element, a first electrode, and a second electrode is provided. The scan line and the data line are intersected to define a rectangular pixel area. The active element is electrically connected to the scan line and the data line. The first electrode has stripe patterns and connecting patterns located in the rectangular pixel area. Each connecting pattern is connected to the central parts or the parts near the central parts of two adjacent stripe patterns to demarcate or define two silts between the two adjacent stripe patterns. The extending direction of the slits is intersected to the rectangle length of the rectangular pixel area by an angle θ wherein 0°≤θ<45°. The second electrode is located between the first electrode and the substrate and part of the second electrode is exposed by the slits.

22 Claims, 9 Drawing Sheets

(56) References Cited

U.S. PATENT DOCUMENTS

| | | | |
|---|---|---|---|
| 2008/0062140 A1* | 3/2008 | Hotelling et al. | 345/173 |
| 2009/0033636 A1 | 2/2009 | Toyota et al. | |
| 2009/0046234 A1* | 2/2009 | Tanaka | 349/141 |
| 2009/0096765 A1* | 4/2009 | Kuo et al. | 345/174 |
| 2009/0180069 A1* | 7/2009 | Nishimura | 349/139 |
| 2009/0213092 A1* | 8/2009 | Kuo et al. | 345/174 |
| 2009/0225267 A1* | 9/2009 | Atarashiya et al. | 349/139 |
| 2009/0296037 A1* | 12/2009 | Tanaka et al. | 349/143 |
| 2011/0001914 A1* | 1/2011 | Tanaka | 349/139 |

OTHER PUBLICATIONS

"Office Action of Taiwan Counterpart Application", issued on Oct. 22, 2012, p. 1-p. 5, in which the listed references were cited.

\* cited by examiner

PIXEL STRUCTURE, TOUCH DISPLAY PANEL AND LIQUID CRYSTAL DISPLAY

CROSS-REFERENCE TO RELATED APPLICATION

This application claims the priority benefit of Taiwan application serial no. 98107894, filed on Mar. 11, 2009. The entirety of the above-mentioned patent application is hereby incorporated by reference herein and made a part of specification.

BACKGROUND OF THE INVENTION

1. Field of the Invention

The present invention generally relates to a pixel structure, a touch display panel and a liquid crystal display, in particular, to a fringe field switching pixel structure, a touch display panel and a liquid crystal display.

2. Description of Related Art

Recently, with the optoelectronic technology and the technology of manufacturing semiconductor maturing, the development of the flat panel display is vigorous promoted. The liquid crystal display gradually replaces the conventional cathode ray tube display based on the advantages of low operation voltage, non-radiation, light weight and small volume, and thus becomes the main stream of the recent display products. However, the liquid crystal display still has a problem of restricted viewing angle. At present, the technology for achieving wide viewing angle display effect includes a twisted nematic (TN) liquid crystal combined with a wide viewing film, an in-plane switching (IPS) liquid crystal display, a fringe field switching (FFS) liquid crystal display and a multi-domain vertically alignment (MVA) liquid crystal display. Herein, the conventional fringe field switching liquid crystal display is discussed.

The schematic top view diagram and the schematic cross-sectional diagram of a pixel structure according to a conventional fringe field switching liquid crystal display are shown in FIG. 1A and FIG. 1B. Referring to FIGS. 1A and 1B, a pixel structure 100 disposed on a substrate 10 includes at least a scan line 102, at least a data line 104, an active device 106, a first electrode 108 and a second electrode 110. The scan line 102 and the data line 104 demarcate a rectangular pixel region P. The first electrode 108 and the second electrode 110 are located in the rectangular pixel region P and the second electrode 110 is electrically connected to the active device 106. In addition, the second electrode 110 is disposed between the first electrode 108 and the substrate 10. The first electrode 108 has a plurality of slits 108A so as to expose a portion of the second electrode 110, that is to say, a portion of the conductive pattern of the first electrode 108 is not overlapped with the second electrode 110 at where the plurality of slits 108A is located.

It is noted that the first electrode 108 is not electrically connected to the active device 106, but electrically connected to a common voltage source (not shown). When the pixel structure 100 displays, the first electrode 108 and the second electrode 110 are applied by different voltages so as to generate a fringe field effect and render the liquid crystal display represent the wide viewing angle display effect.

The pixel structure 100 is apt to improve the display effect of liquid crystal display. However, certain undesirable effect may occur when the liquid crystal display having the pixel structure 100 attached with a touch panel to form a touch display panel. For example, the liquid crystal molecules of the liquid crystal display may be disturbed and thus disorderly arrange when a user press the above-mentioned touch display panel. Accordingly, the phenomenon of uneven brightness may occur at the place surrounding the touch point and the judgments of the touch input or the writing input of the touch panel may be harmfully influenced. In the meantime, the slits 108A of the pixel structure 100 are capable of having an influence on the restore time of the disturbed liquid crystal molecules. In particular, the longer the length of the slits 108A is the prolonging the restore time of the disturbed liquid crystal molecules is.

SUMMARY OF THE INVENTION

Accordingly, the present invention is directed to a pixel structure for shortening the restore time of the disturbed liquid crystal molecules of a fringe field switching pixel structure.

The present invention is further directed to a touch display panel for improving the restore efficiency of the liquid crystal molecules after the touch display panel is pressed.

The present invention is again directed to a liquid crystal display having good quality.

The present invention is directed to a pixel structure disposed on a substrate. The pixel structure includes a scan line, a data line, an active device, a first electrode and a second electrode. The data line is intersected with the scan line so as to define a rectangular pixel region. The active device is electrically connected to the scan line and the data line. The first electrode has a plurality of stripe patterns and a plurality of connecting patterns located in the rectangular pixel region. Each of the connecting patterns connects two adjacent stripe patterns at a center part or parts near the center part of the respective stripe patterns to demarcate a plurality of slits. An extending direction of the silts intersects with a rectangle length of the rectangular pixel region at an angle θ and θ complies with 0°≤θ<45°. The second electrode is located between the first electrode and the substrate, and the slits expose a portion of the second electrode.

The present invention is additionally directed to touch display panel including a substrate, an opposite substrate, a light-valve layer, an active device, a first electrode, a second electrode, a touch device layer and an opposite electrode. The substrate has a rectangular pixel region having a rectangle length and a rectangle width, wherein a length of the rectangle length is L and a length of the rectangle width is W, and W<L. The light-valve layer is located between the substrate and the opposite substrate. The active device is disposed on the substrate. The first electrode is located in the rectangular pixel region and has a plurality of slits. A length of the slits is L. The rectangle length intersects the slits at a first angle θ and the rectangle width intersects the slits at a second angle ψ, wherein θ is smaller than ψ. The second electrode is a whole block and entirely disposed on the substrate, and the slits expose a portion of the second electrode. The touch device layer is disposed on the substrate. The opposite electrode is disposed between the light-valve layer and the touch device layer.

The present invention is further directed to a pixel structure disposed on a rectangular pixel region of a substrate. The rectangular pixel region defines a long axis direction and a short axis direction. The pixel structure includes an upper transparent electrode and a bottom transparent electrode. The upper transparent electrode is located in the rectangular pixel region and has a first slit and a second slit. The first slit is intersected clockwise with the long axis direction at a first angle θ1 while 0°≤θ1<45°. The second slit is intersected counter clockwise with the long axis direction at a second angle θ2 while 0°≤θ2<45°. The first angle θ1 and the second angle θ2 are axile symmetric according to the short axis direction. The bottom transparent electrode is located between the upper transparent electrode and the substrate. The bottom electrode is a whole block transparent electrode, that is, the bottom transparent electrode is a transparent electrode without a slit.

The present invention is further directed to a liquid crystal display including a substrate, an opposite substrate, a liquid crystal layer, and one of the above-mentioned pixel structures. The liquid crystal layer is located between the substrate and the opposite substrate and the pixel structure is disposed on the substrate.

The present invention adopts the design of connecting patterns so that at least a part of the slits of the fringe field switching pixel structure is shortened. Accordingly, the disorder arrangement of the liquid crystal molecules caused by a user's pressing can be restored rapidly when the fringe field switching pixel structure applied to a touch display panel. In another word, the present invention provides not only a pixel structure having wide viewing angle display effect and the liquid crystal display having the same, but also a pixel structure design with the liquid crystal molecules having good restore efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
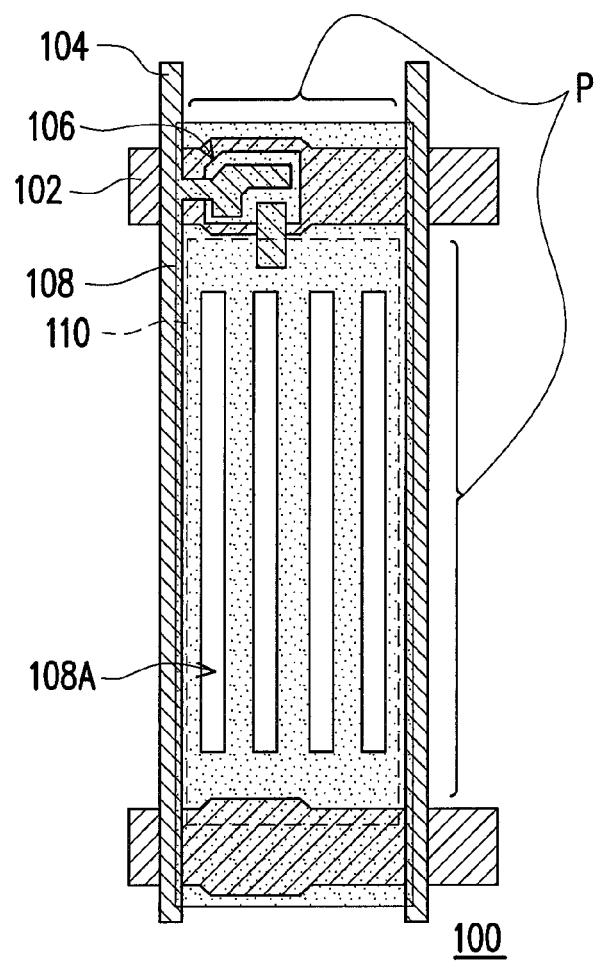
FIG. 1A illustrates a schematic top view diagram of a conventional fringe field switching pixel structure.
Figure 1B:
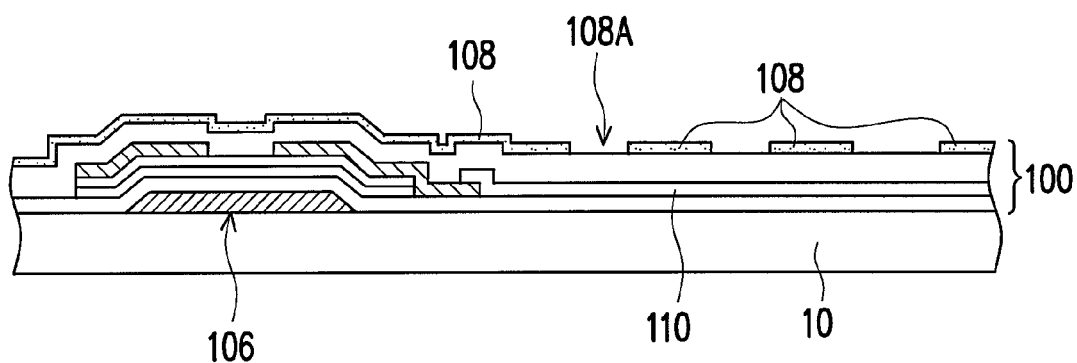
FIG. 1B illustrates a schematic cross-sectional diagram of a conventional fringe field switching pixel structure.

Reference will now be made in detail to the present embodiments of the invention, examples of which are illustrated in the accompanying drawings. Wherever possible, the same reference numbers are used in the drawings and the description to refer to the same or like parts.

According to the above-mentioned conventional art, the pixel structure 100 as shown in FIG. 1A is capable of providing the fringe field effect to achieve the wide viewing angle display effect. However, the pixel structure 100 has narrow and long slits 108A and thus a problem that the restore time of the liquid crystal molecules is restricted by the length of the slits 108A when the pixel structure 100 is applied to a touch display panel is generated. Accordingly, for rendering the liquid crystal molecules have better restore efficiency without significantly modifying the original design of the pixel structure 100, the present invention provides the following fringe field switching pixel structures as examples.

Figure 2A:
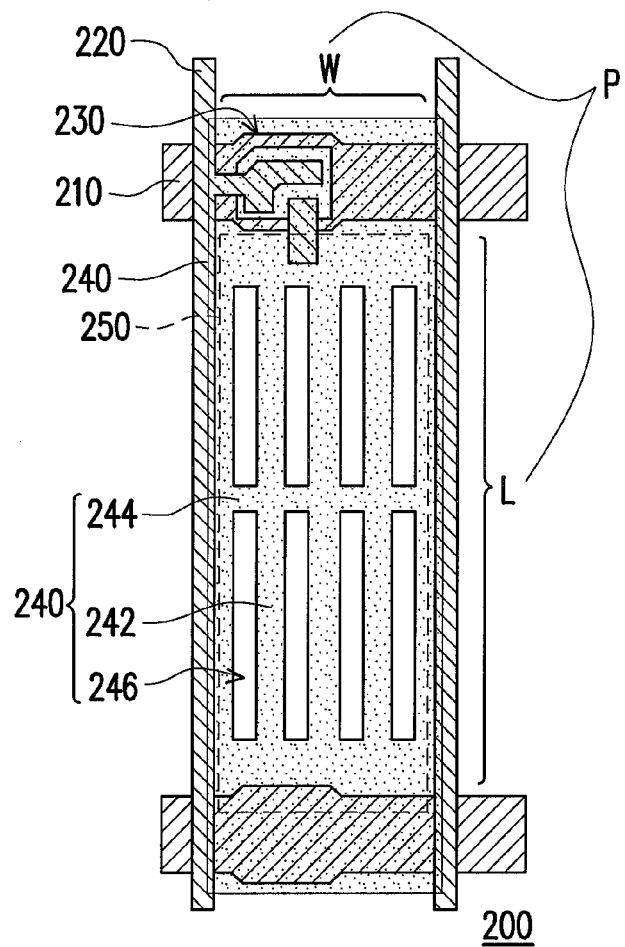
FIG. 2A illustrates a schematic top view diagram of a pixel structure according to a first embodiment of the present invention.
Figure 2B:
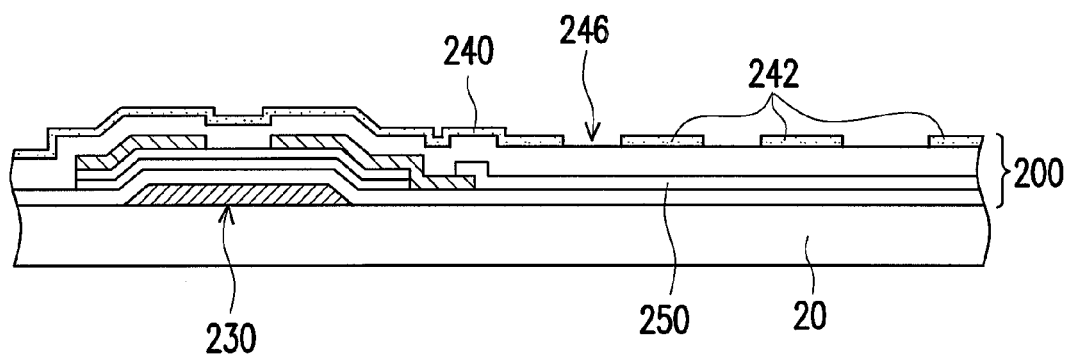
FIG. 2B illustrates a schematic cross-sectional diagram of a pixel structure according to a first embodiment of the present invention.

FIGS. 2A and 2B illustrate respectively the schematic top view diagram and the schematic cross-sectional diagram of a pixel structure according to a first embodiment of the present invention. Referring to FIGS. 2A and 2B simultaneously, a pixel structure 200 is disposed on a substrate 20. The pixel structure 200 includes at least a scan line 210, at least a data line 220, an active device 230, a first electrode 240 and a second electrode 250. The scan line 210 intersects with the data line 220 to define or form a rectangular pixel region P. The active device 230 is electrically connected to the scan line 210 and the data line 220. The first electrode 240 has a plurality of stripe patterns 242 and a plurality of connecting patterns 244 located in the rectangular pixel region P. Each of the connecting patterns 244 connects two adjacent stripe patterns 242 at where the center part or the parts near the center part of the respective stripe patterns 242 is. In the present embodiment, the amount of the slits 246 is twice as the amount of the connecting patterns 244, but it is not restricted. The second electrode 250 is located between the first electrode 240 and the substrate 20, and the slits 246 expose a portion of the second electrode 250. That is to say, the first electrode 240 is not overlapped with the second electrode 250 at where the plurality of slits 246 is, but the first electrode 240 is overlapped with the second electrode 250 at where the stripe patterns 242 and the connecting patterns 244 are. In a word, the first electrode 240 is at least overlapped with the stripe patterns 242 and the connecting patterns 244.

Specifically, the rectangular pixel region P has a rectangle length and a rectangle width, wherein a length L of the rectangle length is larger than a length W of the rectangle width. An angle included between the extending direction of the slits 246 and the rectangle length of the rectangular pixel region P is θ. In the present embodiment, the extending direction of the slits 246 may be parallel to the rectangle length of the rectangular pixel region P. Accordingly, the angle θ is 0° here and is not marked in FIG. 2A. Nevertheless, the angle θ may be ranged between 0° and 45°, that is, 0°≤θ<45°, in other embodiments, and the embodiments particularly shown in FIG. 4A through FIG. 4D below represent the situation that the angle θ is ranged between 0° and 45°. In addition, the stripe patterns 242 of the present embodiment are a plurality of straight line patterns and the connecting patterns 244 are arranged along a straight line as an example. That is to say, in the pixel structure 200 of the present embodiment, the first electrode 240 is designed as a railings-shape pattern. Each of the slits 246 is substantially independent from one another and each of the slits 246 is a bar-like slit which extends along a direction parallel to or close to the extending direction of the rectangle length. In particular, the first electrode 240 is designed as an enclosing electrode pattern.

In the pixel structure 200, the second electrode 250 is a whole block and entirely disposed in the rectangular pixel region P of the substrate 20. In another word, the second electrode 250 does not have a patterned design such as slits. Specifically, the second electrode 250 is a complete rectangular electrode pattern in the present embodiment. In addition, the active device 230 is electrically connected to the second electrode 250, but electrically insulted with the first electrode 240. That is to say, the second electrode 250 is designed as a pixel electrode in the pixel structure 200. The second electrode 250 receives the data signal transmitted by the data line 220 and the first electrode 240 is input by a common signal provided by a common voltage source (not shown) when the pixel structure 200 displays an image. The railing-shape first electrode 240 exposes a portion of the second electrode 250 and thus a fringe field effect is generated at where the slits 246 are. Accordingly, the wide viewing angle display effect can be achieved when the pixel structure 200 is applied to a liquid crystal display. In the present embodiment, the lengths of the slits 246 are equal to each other. Therefore, the restore time of the liquid crystal molecules for each slit 246 is identical.

Figure 2C:
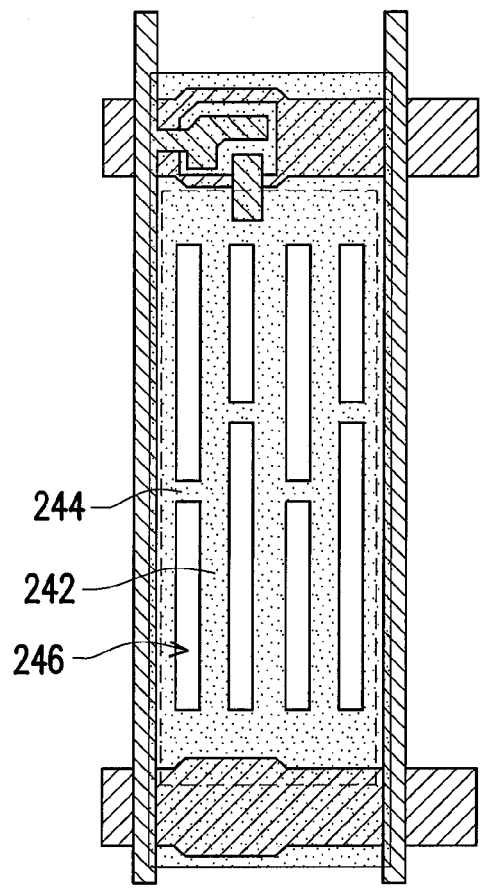
FIGS. 2C through 2F illustrate a plurality of first electrodes of pixel structures according to the first embodiment of the present invention.
Figure 2D:
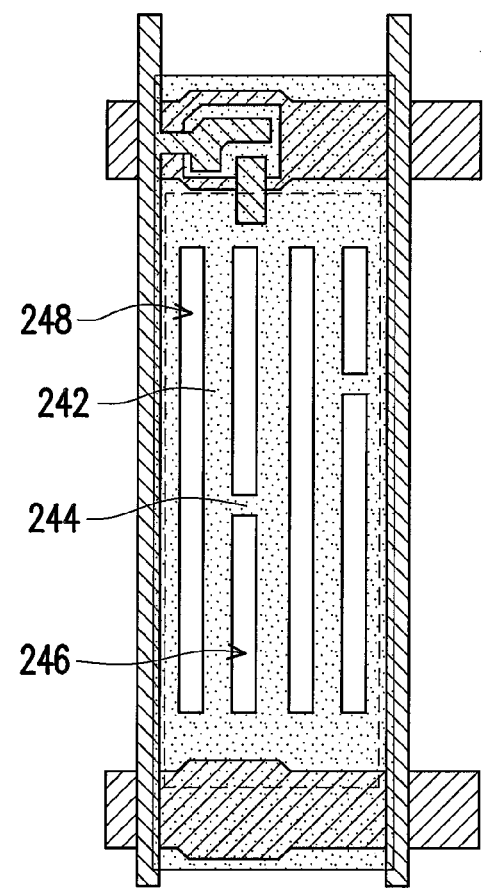
Figure 2E:
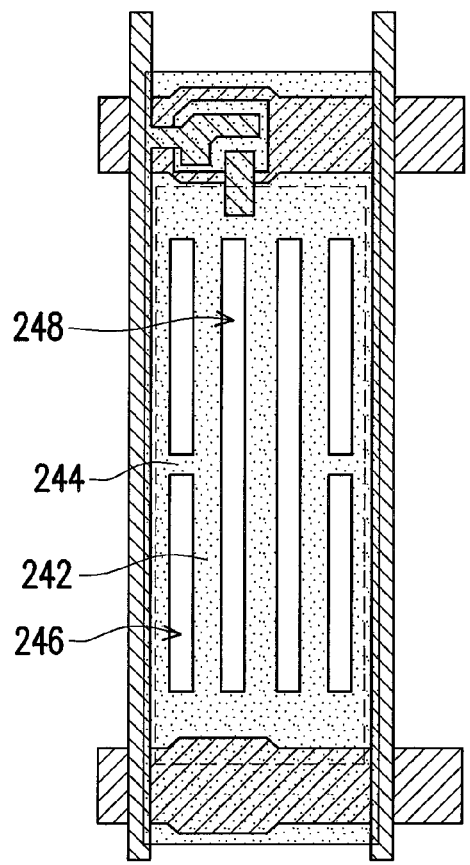
Figure 2F:
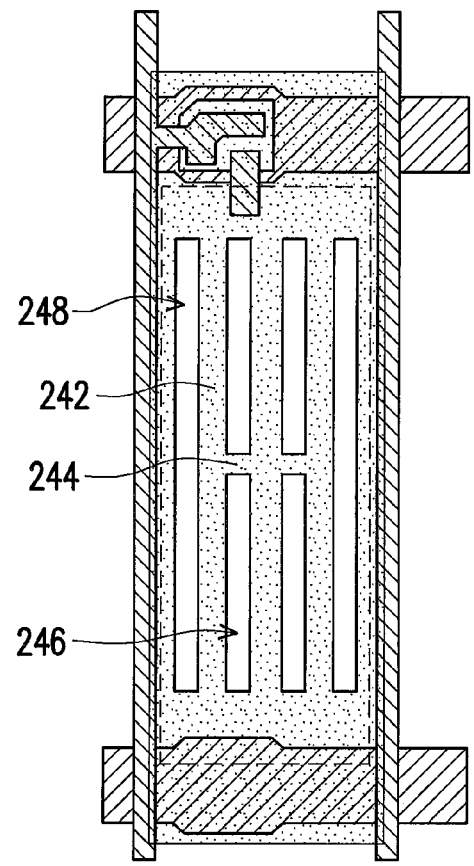

However, the first electrode 240 of the present embodiment is not restricted in the above-mentioned design. For example, FIGS. 2C through 2F are a plurality of the first electrodes of the pixel structure according the first embodiment of the present invention. The above-mentioned connecting patterns 244 may be staggeringly arranged but not linearly arranged, and the amount of the slits 246 is also twice as the amount of the connecting patterns 244 as shown in FIG. 2C. It is noted that the slits 246 are not symmetrically disposed. If the pixel structure applied in a liquid crystal display, the asymmetric disposition of the slits 246 can cause a field force on the liquid crystals. The restore times of the liquid crystal molecules are varied according to the lengths of the slits 246. Two of the longer slits 246 have the slower restore times, two of the shorter slits 246 have the faster restore times, four of the slits 246 have the middle restore times as the embodiment described in FIGS. 2A and 2B. Therefore, uneven brightness caused by user pressing or press mura can be further reduced. On the other hand, the liquid crystal molecules between the different lengths slits 246 are implicating to each other, so the restore speed for the entire pixel structure 200 may also be faster. Specifically, as shown in FIGS. 2D through 2F, the connecting patterns 244 may connect any two adjacent stripe patterns 242 and may optionally connect some adjacent stripe patterns 242. The amount of the slits 246 is twice as the amount of the connecting patterns 244 in the present embodiment, but slits 248 which are not defined by connecting patterns 244 are also disposed in the rectangular pixel region. Therefore, the total amount of the slits 246 and 248 can be larger than the amount of the connecting patterns 244. The connecting patterns 244 are generally configured for shortening the length of the silts 246 so as to enhance the restoring speed of the liquid crystals if the liquid crystals are disturbed, but the configuration of the connecting patterns 244 may slightly reduce the display aperture ratio. Accordingly, in the present embodiment, a portion of the silts such as the slits 248 are not defined by the connecting patterns 244 to be conducive to increase the display aperture ratio. Similarly, the connecting patterns 244 as shown in FIGS. 2D through 2F can be either linearly arranged or staggeringly arranged.

Furthermore, as shown in FIG. 2A, two opposite ends of each of the stripe patterns 242 direct toward the two opposite rectangle width of the rectangular pixel region P in the present embodiment. Hence, the connecting patterns 244 of the present embodiment render the first electrode 240 in each of the rectangular pixel structure region P have at least two slits 246 in the extending direction of the rectangle length. When it is compared with the conventional pixel structure 100, the pixel structure 200 of the present embodiment at least has some slits 246 which are shorter in length. Specifically, the length L of the rectangle length of the rectangular pixel region P in the present embodiment and the length Γ of the slits 246 comply with a relationship that is 0.50L<Γ<0.71L.

Figure 3A:
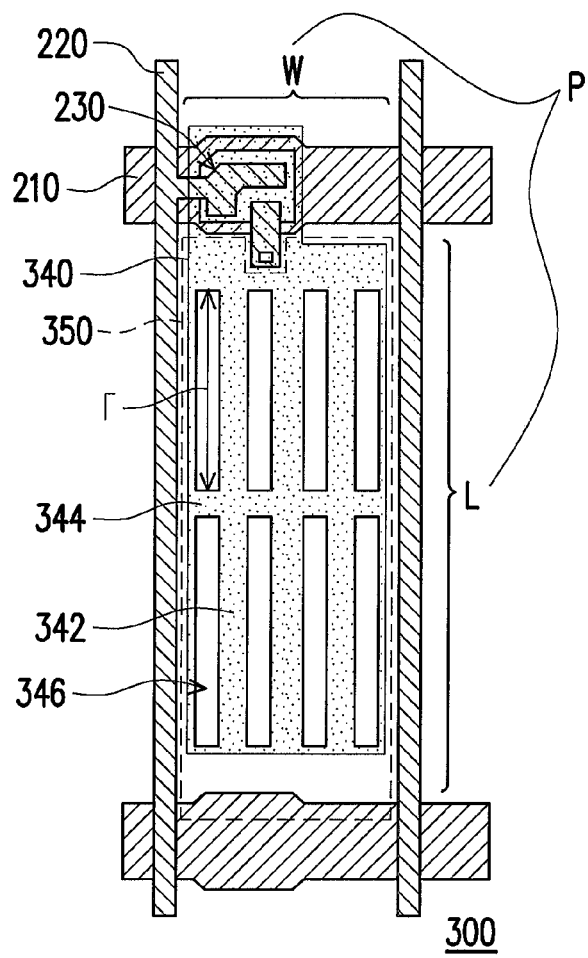
FIG. 3A illustrates a schematic top view diagram of a pixel structure according to a second embodiment of the present invention.
Figure 3B:
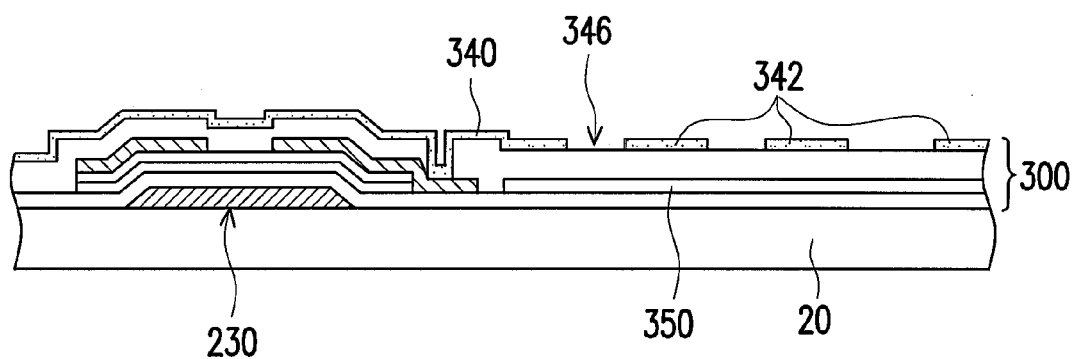
FIG. 3B illustrates a schematic cross-sectional diagram of a pixel structure according to a second embodiment of the present invention.

In the first embodiment, the active device 230 is electrically connected to the second electrode 250; however, the active device 230 may be electrically connected to the first electrode 240 in other embodiments. FIGS. 3A and 3B illustrate a schematic top view diagram and a schematic cross-sectional diagram of a pixel structure according to a second embodiment of the present invention. Referring to FIGS. 3A and 3B, the pixel structure 300 is substantially the same as the pixel structure 200 and the difference between the two pixel structures 200 and 300 is that the active device 230 of the pixel structure 300 is electrically connected to the first electrode 340 and electrically insulated with the second electrode 350. In another word, the first electrode 340 is a pixel electrode in the second embodiment. In the present embodiment, the first electrode 340 may cover the whole active device 230 and may merely cover a part of the drain of the active device 230. The present invention is not only restricted here. The first electrode 340 receives the data signal transmitted by the data line 220 and the second electrode 350 receives a common signal provided by a common voltage source (not shown) when the pixel structure 300 displays an image. Accordingly, a fringe field effect can be generated in the pixel structure 300 and thus a wide viewing angle display effect is achieved.

Substantially, the first electrode 340 illustrated in FIG. 3A also has the stripe patterns 342 and connecting patterns 344. The connecting patterns 344 and the stripe patterns 342 define or demarcate a plurality of slits 346 and the amount of the slits 346 is twice as the amount of the connecting patterns 344. The region where the slits 346 are located at is the region where the fringe field effect occurs at. In addition, in the rectangular pixel region P demarcated by the scan line 210 and the data line 220, each of the connecting patterns 344 may define two slits 346, but two or more than two slits 346 may be disposed in the extending direction of the rectangle length of the rectangular pixel region P. That is to say, the specific two adjacent stripe patterns 342 may be connected by more than one connecting patterns 344. Certainly, the pattern design of the slits 346 in the first electrode 340 may be the same as the pattern design shown in FIG. 2C through FIG. 2F, but it is not restricted.

Besides, the pattern design of the first electrode 340 may vary in other embodiments, wherein the stripe patterns 342 may not be in a bar-like shape parallel to each other. FIG. 4A to FIG. 4D illustrate a plurality of first electrode patterns of pixel structures according to a third embodiment of the present invention. Herein, the elements besides the first electrode in the pixel structure of the third embodiment may refer to the first embodiment or the second embodiment, and thus the following descriptions only depict the pattern designs of the first electrode.

Figure 4A:
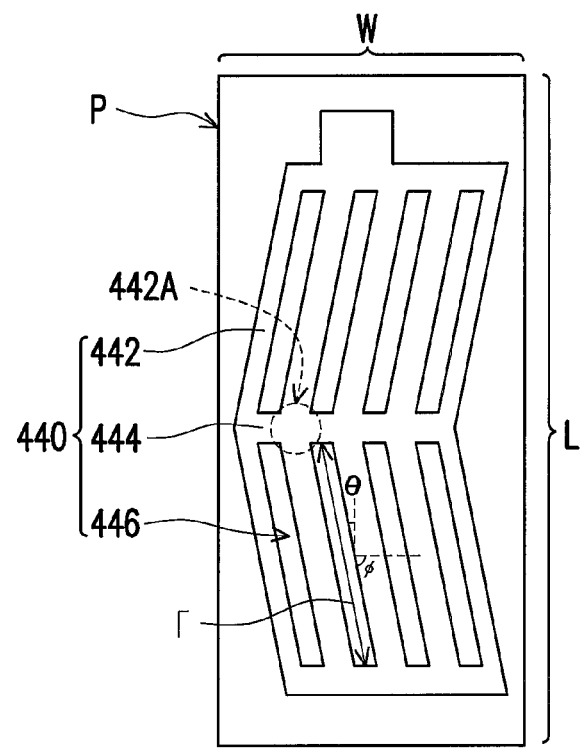
FIGS. 4A through 4D illustrate a plurality of first electrodes of pixel structures according to the third embodiment of the present invention.

Referring to FIG. 4A, the first electrode 440 has a plurality of bended stripe patterns 442 and a plurality of connecting patterns 444 arranged along a straight line. The spaces between the stripe patterns 442 and the connecting patterns 444 are defined as a plurality of slits 446 and the amount of the slits 446 is twice as the amount of the connecting patterns 444. Each of the stripe patterns 442 has a bended portion 442A and the bended portion 442A is located between the two ends of the stripe pattern 442. That is to say, the stripe pattern 442 is design as a corner-shape "<", but the present invention is not restricted here. In addition, the connecting patterns 444 connect, for example, the two stripe patterns 442 at which two adjacent bended portions 442A is located in the present embodiment, but the present invention is not restricted here.

Figure 4B:
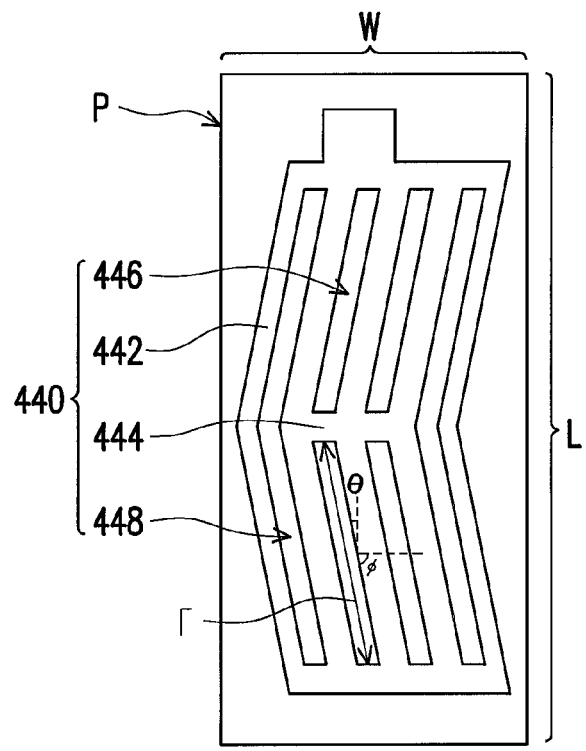
Figure 4C:
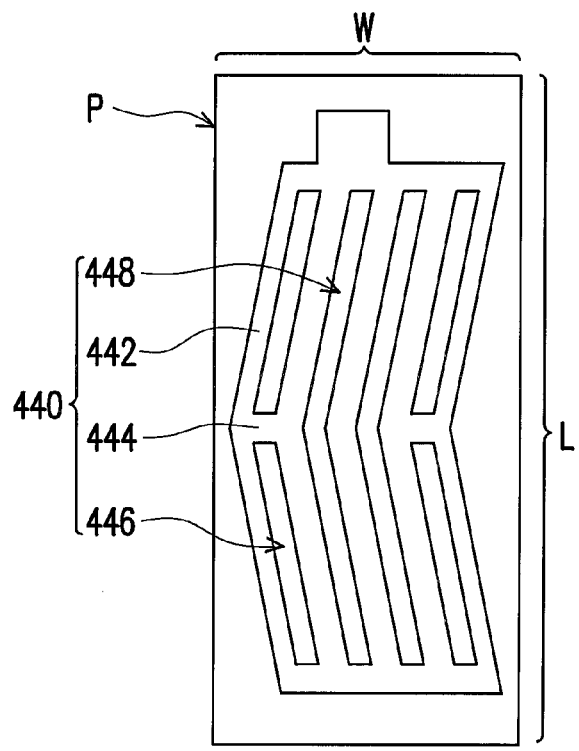
Figure 4D:
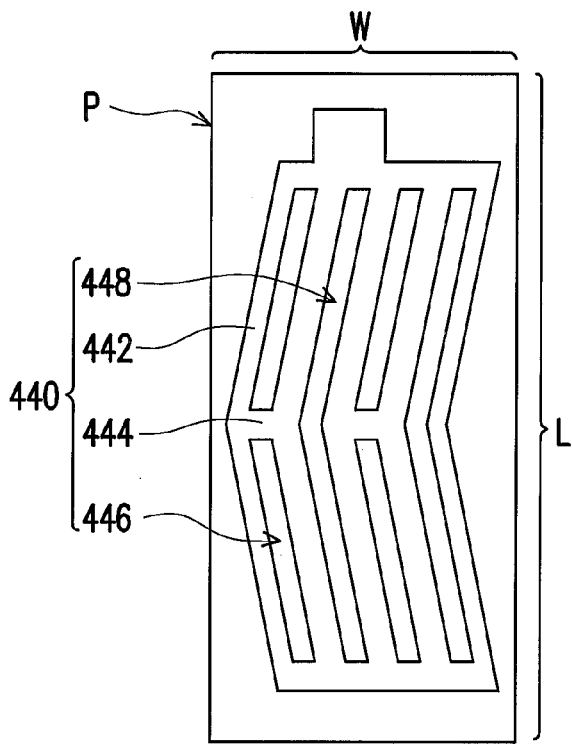

Particularly, an extending direction of the slits 446 intersect the rectangle length of the rectangular pixel region P at an angle θ, wherein 0°≤θ<45°. In other embodiments, the angle θ can be 10°±5°, that is to say, 5°≤θ≤15° for better transmittance, wider viewing angle, and higher contrast etc. A length of the slits 446 may be L. More particularly, the rectangle length and the slits 446 intersect at a first angle θ, and the rectangle width and the slits 446 intersect at a second angle ψ, wherein θ is smaller than ψ for higher transmittance. In addition, the connecting patterns 444 can merely connect some of the stripe patterns 442 as shown in FIG. 4B through FIG. 4D. The amount of the slits 446 may be twice as the amount of the connecting patterns 444, but the slits 448 which are not defined by the connecting patterns 444 are disposed in the rectangular pixel region P. Therefore, the total amount of the slits 446 and 448 can be larger than the amount of the connecting patterns 444. The angle θ defined by the intersecting of the slits 446 and the rectangle length of the rectangular pixel region P is fixed in the present embodiment, that is to say, the two slits 446 adjacent to one of the connecting patterns 444 are axile symmetric according to the extending direction of the rectangle width.

The first electrode 440 has a plurality of bended stripe patterns 442 and thus such design applied to a liquid crystal display renders the liquid crystal molecules arrange in multi-domain arrangement during displaying. That is to say, the design of the first electrode 420 in the present embodiment is apt to compensate the display effect of the liquid crystal display so as to improve the display quality of the liquid crystal display. Certainly, the connecting patterns 444 are also apt to shorten the length of the slits 446.

Figure 5:
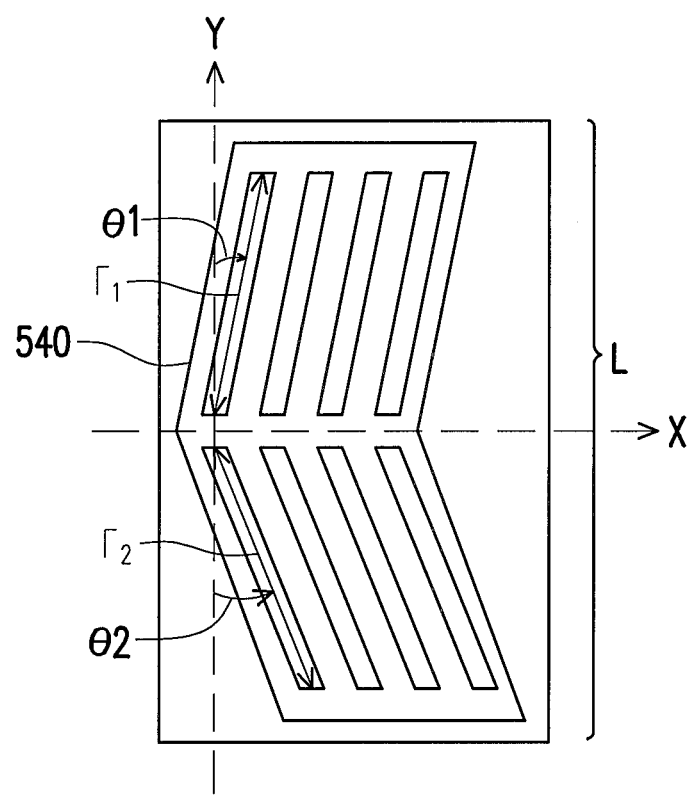
FIG. 5 illustrates a first electrode of a pixel structure according to the fourth embodiment of the present invention.

Furthermore, FIG. 5 illustrates a first electrode of the pixel structure according to a fourth embodiment of the present invention. The elements of the pixel structure according to the fourth embodiment are the same as the elements anticipated by the first embodiment or the second embodiment besides the first electrode. Therefore, FIG. 5 only represents the first electrode, and other elements and the related descriptions can refer to the first embodiment or the second embodiment.

Referring to FIG. 5, the rectangular pixel region P has a long axis direction Y and a short axis direction X. The first electrode 540 is located in the rectangular pixel region P and has a first slit Γ1 and a second slit Γ2. Herein, the first slit Γ1 and the second slit Γ2 are independent from each other and are not connected with each other. The first slit Γ1 intersects with the long axis direction Y clockwise at a first angle θ1 while 0°≤θ1<45°. The second slit Γ2 intersects the long axis Y counter clockwise at a second angle θ2 while 0°≤θ2<45°. Herein, the first angle θ1 is not equal to the second angle θ2, for example. In other embodiments, the first angle θ1 and the angle θ2 are axile symmetric according to the short axis direction X. That is to say, the first angle θ1 and the angle θ2 are substantially equal.

In the present embodiment, the rectangular pixel region P has a rectangle length which is parallel to the long axis direction Y, and a relationship of the length of the first slit Γ1 or the second slit Γ2 and the length L of the rectangle length is 0.50L<Γ1 or Γ2≤0.52L. In the present embodiment, a material of the first electrode 540 is a transparent conductive material, i.e., the first electrode 540 is a transparent electrode. In the pixel structure (not shown) applying the first electrode 540, the second electrode (not shown) can also be made by transparent conductive material. However, the present invention does not restrict the material of the first electrode 540 and the second electrode (not shown). The material of the first electrode 540 and the second electrode (not shown) may be non-transparent conductive material such as metal when the pixel structure is applied to a reflective liquid crystal display. In addition, the pixel structures having the electrode design illustrated in FIGS. 4A~4D and 5 can have at least two display domains so that the display effect is improved. For more specifically, the viewing angles are larger and the color shifts are smaller in these embodiments.

In the above-mentioned first electrodes 240, 340, 440, and 540, two or more than two slits 246, 346, and 446 can be arranged along the extending direction of the rectangle length of the rectangular pixel region P. That is to say, the lengths of the slits 246, 346, and 446 are shorter than the design of the conventional pixel structure 100. Therefore, the pixel structures of the above embodiments used in the liquid crystal display renders the liquid crystal molecules restore in a short time after being disturbed. Therefore, the liquid crystal display and the touch display panel having the electrode design such as the first electrodes 240, 340, 440, or 540 can represent good quality. Specifically, the liquid crystal molecules can restore to the original statement rapidly so as to prevent from the bad influence on the display quality when a user press the touch display panel for processing a touch control.

The method for manufacturing the above-mentioned first electrode 240, 340, 440, or 540 requires only modifying the mask pattern and thus the method is not complicated. In a word, the manufacturing process of the pixel structure depicted in the present invention is compatible to the conventional manufacturing process thereof.

Figure 6:
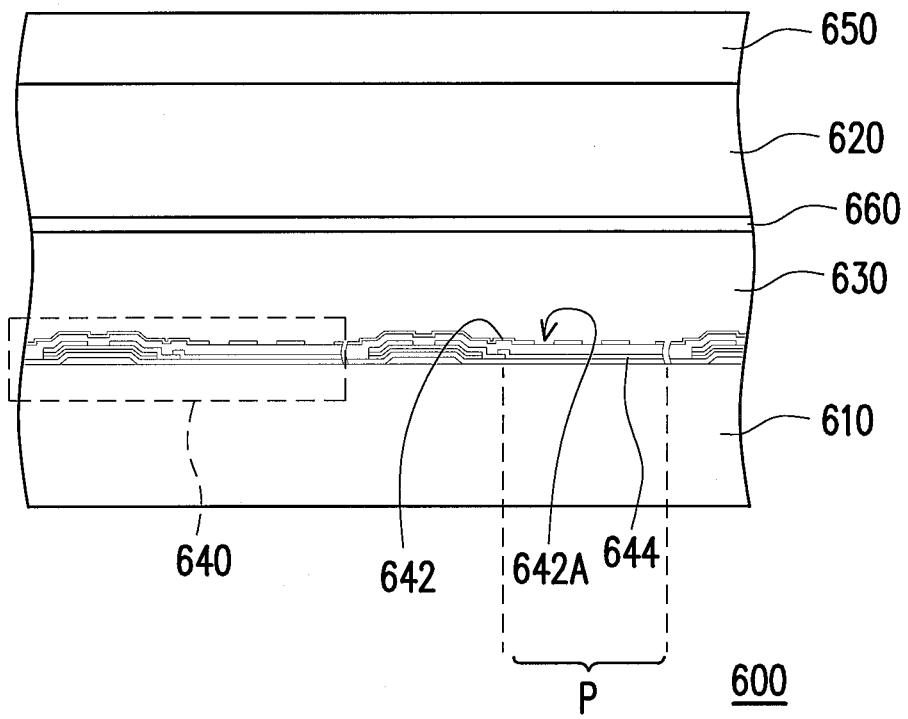
FIG. 6 illustrates a touch display panel according to an embodiment of the present invention.

More specifically, the description about a touch display panel applied the pixel structures of the present invention are set forth below as an example. FIG. 6 is a touch display panel according to an embodiment of the present invention. Referring to FIG. 6, the touch display panel 600 includes a substrate 610, an opposite substrate 620, a light-valve layer 630, a plurality of pixel structure 640, a touch device layer 650 and an opposite electrode 660. In the present embodiment, the pixel structure 640 is disposed on the substrate 610 and the pixel structure 640 can be at least any one of the pixel structures provided in the first, the second, the third and the fourth embodiments. The light-valve layer 630 is located between the substrate 610 and the opposite substrate 620. The touch device layer 650 is disposed on the opposite substrate 620 and the opposite electrode 660 is disposed between the light-valve layer 630 and the touch device layer 650. For example, the opposite substrate 620 is located between the touch device layer 650 and the opposite electrode 660.

In the present embodiment, the light-valve layer 630 is a liquid crystal layer and therefore the touch display panel 600 can be any display panel of a liquid crystal display. Certainly, the light-valve layer 630 can also be the layers made by other materials that can provide the light-valve function under the change of an electric field. On the other hand, the pixel structure of the present embodiment can be designed as the pixel structures described in the above-mentioned embodiments. That is to say, the substrate 610 may have a rectangular pixel region P. A first electrode 642 and a second electrode 644 is disposed in each of the pixel structure 640, wherein the first electrode 642 has a plurality of slits 642A located in the rectangular pixel region P. A length of the slits 642A is Γ. A length of the rectangle length of the rectangular pixel region P is L and a length of the rectangle width of the rectangular pixel region P is W. The rectangle length intersects the slits 642A at a first angle θ which complies 0°≤θ<45°, and the rectangle width intersects the slits 642A at a second angle ψ which complies θ<ψ as shown in FIGS. 4A and 4B. Such pixel structure 640 can provide good wide viewing display effect and further improve the quality of the touch display panel 600.

Particularly, the pixel structure 640 has at least the slits 642A shorter than the slit designed in the conventional pixel structure. Specifically, L and Γ comply with a relationship that 0.50 L<Γ<0.71L, and preferably 0.50 L<Γ0.52L in the present embodiment. Therefore, the liquid crystal molecules of the light-valve layer 630 can restore into the original statement rapidly after a user press the touch display panel 600 for touch control. In another word, the display quality of the touch display panel 600 would not suffer a bad influence by the press of a touch control and thus the quality of the touch display panel 600 is further improved.

In the present embodiment, the touch device layer 650 has a plurality of touch devices (not shown), wherein each of the touch devices may be an optical touch device, a capacitance touch device, a resistance touch device, or an infrared touch device. In other words, the touch devices can be any devices designed by the touch sensing principles. Besides, a color filter layer (not shown) can be further disposed between the opposite electrode 660 and the opposite substrate 620 so as to achieve multi-color display effect. For letting a light pass through the opposite electrode 630 and display after passing the light-valve layer 630, the opposite electrode 660 is substantially a transparent electrode which is made by indium tin oxide, indium zinc oxide, zinc aluminium oxide or zinc antimony oxide.

Figure 7:
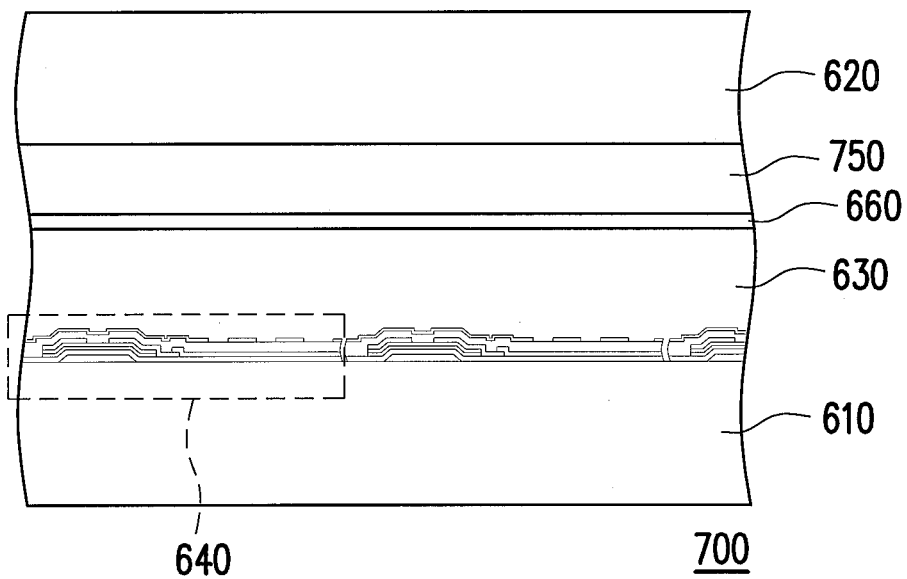
FIG. 7 illustrates a touch display panel according to another embodiment of the present invention.

FIG. 7 illustrates a touch display panel according to another embodiment of the present invention. Referring to FIG. 7, the touch device layer 750 of the touch display panel 700 is located between the opposite substrate 620 and the opposite electrode 660. Under the configuration, the touch device layer 750 can have a plurality of color filter patterns (not shown). That is to say, the touch device layer 750 can be incorporated into the color filter layer to simplify the device design of the touch display panel 700. Certainly, the touch display panel can also have the advantages of wide viewing angle display effect, and good restore efficiency of the liquid crystal molecules and good display quality, etc.

To sum up, in the pixel structure, the touch display panel and the liquid crystal display of the present invention, the extending direction of the slits is parallel to or close to the rectangle length direction of the rectangular pixel region and also the length of the slits is shorter than that of the conventional design. Therefore, the liquid crystal molecules of the touch display panel and the liquid crystal display are apt to rapidly restore to the original statement after being disturbed by an outer force. Accordingly, the display effect of the touch display panel and the liquid crystal display would not suffer bad influence caused by the pressing or the touch control of a user. That is to say, the touch display panel and the liquid crystal display of the present invention have good display quality. Furthermore, the manufacturing process of the pixel structure according to the present invention is compatible with that of the conventional pixel structure so as to prevent the method for manufacturing the touch display panel and the liquid crystal display from being complicated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure disposed on a substrate, and the pixel structure comprising:
   a scan line;
   a data line intersected with the scan line so as to define a rectangular pixel region;
   an active device electrically connected to the scan line and the data line;
   a first electrode having a plurality of stripe patterns and a plurality of connecting patterns located in the rectangular pixel region, and the connecting patterns connecting at least one of a plurality of two adjacent stripe patterns at a center part of the respective stripe patterns to demarcate a plurality of slits, two of the slits being separated by one of the connecting patterns such that one of the two slits is located at a side of the one of the connecting patterns adjacent to the scan line, and the other of the two slits is located at another side of the one of the connecting patterns away from the scan line, wherein an extending direction of the slits intersects with a rectangle length of the rectangular pixel region at an angle θ and θ complies with 0°≤θ<45°; and
   a second electrode located between the first electrode and the substrate, and the slits exposing a portion of the second electrode;
   at least another one of the plurality of the two adjacent stripe patterns are not separated by the connecting patterns.

2. The pixel structure according to claim 1, wherein the stripe patterns are a plurality of straight line patterns.

3. The pixel structure according to claim 1, wherein the stripe patterns are a plurality of bended patterns and each of the stripe patterns has a bended portion which is located between two ends of the stripe pattern.

4. The pixel structure according to claim 1, wherein the second electrode is a complete block and entirely disposed in the rectangular pixel region of the substrate.

5. The pixel structure according to claim 1, wherein the active device electrically connected to the first electrode and electrically insulated with the second electrode.

6. The pixel structure according to claim 1, wherein the active device electrically connected to the second electrode and electrically insulated with the first electrode.

7. A touch display panel comprising:
   a substrate having a plurality of pixel structures as claimed in claim 1;
   an opposite substrate disposed opposite to the substrate;
   a light-valve layer located between the substrate and the opposite substrate;
   a touch device layer disposed on the opposite substrate; and
   an opposite electrode disposed between the light-valve layer and the touch device layer.

8. The pixel structure according to claim 1, wherein the connecting patterns are arranged along a virtual axis which is substantially parallel to the scan line.

9. A pixel structure disposed on a substrate and comprising:
   a scan line;
   a data line intersecting with the scan line so as to define a rectangular pixel region, and the rectangular pixel region has a rectangle length and a rectangle width, wherein a length of the rectangle length is L, a length of the rectangle width is W, and W is smaller than L;
   a first electrode disposed on the substrate and having a plurality of slits located in the rectangular pixel region, wherein a length of each of the slits is Γ; and a second electrode disposed in the rectangular pixel region of the substrate and the slits exposing a portion of the second electrode, wherein a relationship of L and $\Gamma$ complies with $0.50L<\Gamma<0.71L$;

wherein the first electrode disposed on the substrate further has a plurality of stripe patterns and a plurality of connecting patterns, and the connecting patterns connecting at least one of a plurality of two adjacent stripe patterns at a center part of the respective stripe patterns to demarcate a plurality of slits, wherein two of the slits being separated by one of the connecting patterns such that one of the two slits is located at a side of the each of the connecting patterns adjacent to the scan line and the other of the two slits is located at another side of the each of the connecting patterns away from the scan line; and at least another one of the plurality of the two adjacent stripe patterns are not separated by the connecting patterns.

10. The pixel structure according to claim 9, wherein the first electrode disposed on the substrate further have a plurality of connecting patterns, wherein two of the slits being separated by one of the connecting patterns such that one of the two slits is located at a side of the each of the connecting patterns adjacent to the scan line and the other of the two slits is located at another side of the each of the connecting patterns away from the scan line.

11. A touch display panel comprising:

a substrate and an opposite substrate, the substrate has a rectangular pixel region having a rectangle length and a rectangle width, a length of the rectangle length is L, a length of the rectangle width is W, and W is smaller than L;

a light-valve layer located between the substrate and the opposite substrate;

an active device disposed on the substrate;

a first electrode disposed on the substrate having a plurality of slits located in the rectangular pixel region, and a length of each of the slits is $\Gamma$, wherein the rectangle length and each of the slits intersect at a first angle $\theta$, and the rectangle width and each of the slits intersect at a second angle $\psi$, wherein $\theta$ is smaller than $\psi$;

a second electrode disposed in the rectangular pixel region of the substrate and the slits exposing a portion of the second electrode;

a touch device layer disposed on the opposite substrate; and an opposite electrode disposed between the light-valve layer and the touch device layer, wherein a relationship of L and $\Gamma$ complies with $0.50L<\Gamma<0.71L$;

wherein the first electrode disposed on the substrate further has a plurality of stripe patterns and a plurality of connecting patterns, and the connecting patterns connecting at least one of a plurality of two adjacent stripe patterns at a center part of the respective stripe patterns to demarcate a plurality of slits, wherein two of the slits being separated by one of the connecting patterns such that one of the two slits is located at a side of the each of the connecting patterns adjacent to the scan line and the other of the two slits is located at another side of the each of the connecting patterns away from the scan line; and at least another one of the plurality of the two adjacent stripe patterns are not separated by the connecting patterns.

12. The touch display panel according to claim 11, wherein the opposite substrate is located between the touch device layer and the opposite electrode.

13. The touch panel display panel according to claim 11, wherein the touch device layer is located between the opposite substrate and the opposite electrode.

14. The touch display panel according to claim 13, wherein the touch device layer has a plurality of color filter patterns.

15. The touch display panel according to claim 11, wherein the active device is electrically connected to the first electrode, and electrically insulted with the second electrode.

16. The touch display panel according to claim 11, wherein the active device is electrically connected to the second electrode, and electrically insulted with the first electrode.

17. The touch display panel according to claim 11, wherein a relationship of the L and the $\Gamma$ complies with $0.50L<\Gamma\leq0.52L$.

18. The touch display panel according to claim 11, wherein the opposite electrode is a transparent electrode.

19. The touch display panel according to claim 11, wherein the first electrode disposed on the substrate further have a plurality of connecting patterns, wherein two of the slits being separated by one of the connecting patterns such that one of the two slits is located at a side of the each of the connecting patterns adjacent to the scan line and the other of the two slits is located at another side of the each of the connecting patterns away from the scan line.

20. A pixel structure disposed in a rectangular pixel region of a substrate, wherein the rectangular pixel region has a long axis direction Y and a short axis direction X, and the pixel structure comprising:

an upper transparent electrode located in the rectangular pixel region having a first slit and a second slit, the first slit and the second slit being separated by a connecting pattern so as to be alternately arranged along the long axis direction Y, the first slit intersected clockwise with the long axis direction Y at a first angle $\theta1$ while $0°\leq45°$, and the second slit intersected counterclockwise with the long axis direction Y at a second angle $\theta2$ while $0°\leq\theta2<45°$, wherein the first angle $\theta1$ and the second angle $\theta2$ are axile symmetric according the short axis direction X; and a bottom electrode located between the upper electrode and the substrate and the bottom electrode being a whole block transparent electrode;

the upper transparent electrode located in the rectangular pixel region further having a third slit and a fourth slit, the third slit and the fourth slit not being separated by the connecting pattern so as to be alternately arranged along the long axis direction Y.

21. The pixel structure according to claim 20, wherein the rectangular pixel region has a rectangle length with a length L parallel to the long axis direction Y, a length of the first slit or the second slit is $\Gamma$, and a relationship of L and $\Gamma$ complies with $0.50L<\Gamma\leq0.52L$.

22. A touch display panel comprising:

a substrate having a plurality of pixel structures as claimed in claim 20;

an opposite substrate disposed opposite to the substrate;

a light-valve layer located between the substrate and the opposite substrate;

a touch device layer disposed on the opposite substrate; and an opposite electrode disposed between the light-valve layer and the touch device layer.

* * * * *